(12) United States Patent
Zhang et al.

(10) Patent No.: US 10,650,249 B2
(45) Date of Patent: May 12, 2020

(54) METHOD AND DEVICE FOR COUNTING PEDESTRIANS BASED ON IDENTIFICATION OF HEAD TOP OF HUMAN BODY (71) Applicant: SHENZHEN UNIVERSITY, Shenzhen, Guangdong (CN)

(72) Inventors: Yong Zhang, Guangdong (CN); Lei Liu, Guangdong (CN); Zehong Chen, Guangdong (CN); Dongning Zhao, Guangdong (CN); Jianyong Chen, Guangdong (CN); Yanshan Li, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 299 days.

(21) Appl. No.: 15/687,422

(22) Filed: Aug. 25, 2017

(65) Prior Publication Data
US 2018/0114073 A1 Apr. 26, 2018

Related U.S. Application Data (63) Continuation of application No. PCT/CN2016/104879, filed on Nov. 7, 2016.

(30) Foreign Application Priority Data

Oct. 25, 2016 (CN) .......................... 2016 1 0931928

(51) Int. Cl.
*G06K 9/00* (2006.01)
*G06T 7/11* (2017.01)
(Continued)

(52) U.S. Cl.
CPC ..... *G06K 9/00778* (2013.01); *G06K 9/00362* (2013.01); *G06T 7/11* (2017.01);
(Continued)

(58) Field of Classification Search
None
See application file for complete search history.

(56) References Cited

U.S. PATENT DOCUMENTS

2014/0071242 A1* 3/2014 Lin .................... G06K 9/00201
348/46
2015/0049906 A1* 2/2015 Fu ........................ G06K 9/3241
382/103
(Continued)

FOREIGN PATENT DOCUMENTS

CN 104751491 A * 7/2015

*Primary Examiner* — Justin P. Misleh (57) ABSTRACT

The present disclosure provides a method and device for counting pedestrians. The method comprises: reading a pedestrian depth image, and comparing the pedestrian depth image and a pre-acquired environmental mean image to acquire a foreground image; dividing the foreground image into a plurality of regions, detecting whether or not there is a step in an edge pixel point of each region, and detecting whether or not the region surface formed in each region coincides with the curved surface of the head top; determining that the currently detected region is the region of the head top when there is a step in the point and when the region surface coincides with the curved surface; and counting and outputting the number of pedestrians according to the region of the head top determined from the pedestrian depth image and the region of the head top determined from an adjacent pedestrian depth image.

8 Claims, 5 Drawing Sheets (51) Int. Cl.
*G06T 7/194* (2017.01)
*G06T 7/181* (2017.01)
*G06T 7/12* (2017.01)
*G06T 7/187* (2017.01)

(52) U.S. Cl.
CPC ............... *G06T 7/12* (2017.01); *G06T 7/181* (2017.01); *G06T 7/187* (2017.01); *G06T 7/194* (2017.01); *G06T 2207/20156* (2013.01); *G06T 2207/20168* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 2016/0055645 A1* | 2/2016 | Ito | G06K 9/00771 382/103 |
| 2016/0110613 A1* | 4/2016 | Ghanem | G06K 9/00778 382/103 |
| 2016/0321507 A1* | 11/2016 | Yang | G06K 9/00778 |
| 2019/0095720 A1* | 3/2019 | Ju | G06K 9/00 |

\* cited by examiner

METHOD AND DEVICE FOR COUNTING PEDESTRIANS BASED ON IDENTIFICATION OF HEAD TOP OF HUMAN BODY

CROSS REFERENCE TO RELATED APPLICATION

The present application is a Continuation Application of PCT application No. PCT/CN2016/104879 filed on Nov. 7, 2016, which claims the benefit of Chinese patent application No. 201610931928.0 filed on Oct. 25, 2016. All the above are hereby incorporated by reference.

TECHNICAL FIELD

The present disclosure is applicable to the field of image recognition technology and, more particularly, to a method and device for counting pedestrians based on the identification of the head top of a human body.

BACKGROUND

With the rapid economic development, the role of cities is growing, and the urban population is also increasing. In order to effectively protect the safety of the urban population, it is necessary to count the number of people in places with a large human traffic such as shopping malls, railway stations and traffic intersections so that the relevant regions set effective safety plans to cope with the occurrence of emergencies and also to provide standards for limiting the human traffic in these places.

The number of people is counted based on the identification of the whole person or the identification of a certain part of the human body. In order to avoid missing detection and false detection resulted from occlusion, a camera generally vertically shoots pictures. The best human body identifying part is the head region. A conventional method counts the number of people in a manner of identifying the human head region. The existing human head identifying technology is mainly achieved by a RGB camera, in particular, extracting the shape, texture and color characteristics of the human head, and then matching the relevant images to achieve the identification of the human head. For example, a large number of human head samples are collected. A machine learning or neural network method is used to train the head samples. A training classifier is used to achieve head detection. With the popularity of deep cameras in recent years, the use of depth cameras instead of RGB cameras to identify human heads has gradually become a research hotspot. The relative distance information carried in a depth image is more conducive to the identification of the human body head than the color and texture information carried in RGB cameras. However, due to the occlusion between pedestrians and other interference factors such as light, the head detection is not high in accuracy, so that the problems such as pedestrian false detection and missing detection still occur frequently.

SUMMARY

It is an object of the present disclosure to provide a method and device for counting pedestrians based on the identification of the head top of a human body in order to solve the problems that the accuracy of the human head detection is reduced and pedestrian false detection and missing detection occur frequently since the prior art is incapable of providing a method for identifying a human head effectively.

In one aspect, the present disclosure provides a method for counting pedestrians based on the identification of the head top of a human body, wherein the method comprises:

reading a pedestrian depth image taken by a depth camera, and comparing the pedestrian depth image and a pre-acquired environmental mean image to acquire a foreground image of the pedestrian depth image;

dividing the foreground image into a plurality of regions, detecting whether or not there is a step in an edge pixel point of each of the plurality of regions, and detecting whether or not the region curved surface formed in each region coincides with the curved surface of the head top of a human body;

determining that the currently detected region is the region of the head top of a human body when there is a step in the edge pixel point of the currently detected region and when the region curved surface formed in the currently detected region coincides with the curved surface of the head top of a human body; and counting and outputting the number of pedestrians according to the region of the head top of a human body determined from the pedestrian depth image and the region of the head top of a human body determined from an adjacent pedestrian depth image.

In another aspect, the present disclosure further provides a device for counting pedestrians based on the identification of the head top of a human body, wherein the device comprises:

a foreground acquiring unit configured to read a pedestrian depth image taken by a depth camera, and compare the pedestrian depth image and a pre-acquired environmental mean image to acquire a foreground image of the pedestrian depth image;

a region detecting unit configured to divide the foreground image into a plurality of regions, detect whether or not there is a step in an edge pixel point of each of the plurality of regions, and detect whether or not the region curved surface formed in each region coincides with the curved surface of the head top of a human body;

a head top determining unit configured to determine that the currently detected region is the region of the head top of a human body when there is a step in the edge pixel point of the currently detected region and when the region curved surface formed in the currently detected region coincides with the curved surface of the head top of a human body; and a pedestrian number outputting unit configured to count and output the number of pedestrians according to the region of the head top of a human body determined from the pedestrian depth image and the region of the head top of a human body determined from an adjacent pedestrian depth image.

The present disclosure reads a pedestrian depth image taken by a depth camera, then compares the pedestrian depth image and a pre-acquired environmental mean image to acquire a foreground image of the pedestrian depth image, further divides the foreground image into a plurality of regions, detects whether or not there is a step in an edge pixel point of each of the plurality of regions, detects whether or not the region surface formed in each region coincides with the curved surface of the head top of a human body, determines that the currently detected region is the region of the head top of a human body when there is a step in the edge pixel point of the currently detected region and when the region surface formed in the currently detected region coincides with the curved surface of the head top of a human body, and counts and outputs the number of pedestrians according to the region of the head top of a human body determined from the pedestrian depth image and the region of the head top of a human body determined from an adjacent pedestrian depth image, thus improving the accuracy of identifying the head top of a human body by the accurate extraction of the head features and realizing the precise statistics of pedestrians.

DESCRIPTION OF THE EMBODIMENTS

The present disclosure will be described in further detail with reference to the accompanying drawings and the embodiments in order to make the objects, technical solutions and advantages of the present disclosure more clearly understood. It is to be understood that the specific embodiments described herein are merely illustrative of the present disclosure and are not intended to limit the present disclosure.

The specific implementation of the present disclosure will be described in detail with reference to specific embodiments:

Embodiment 1

Figure 1:
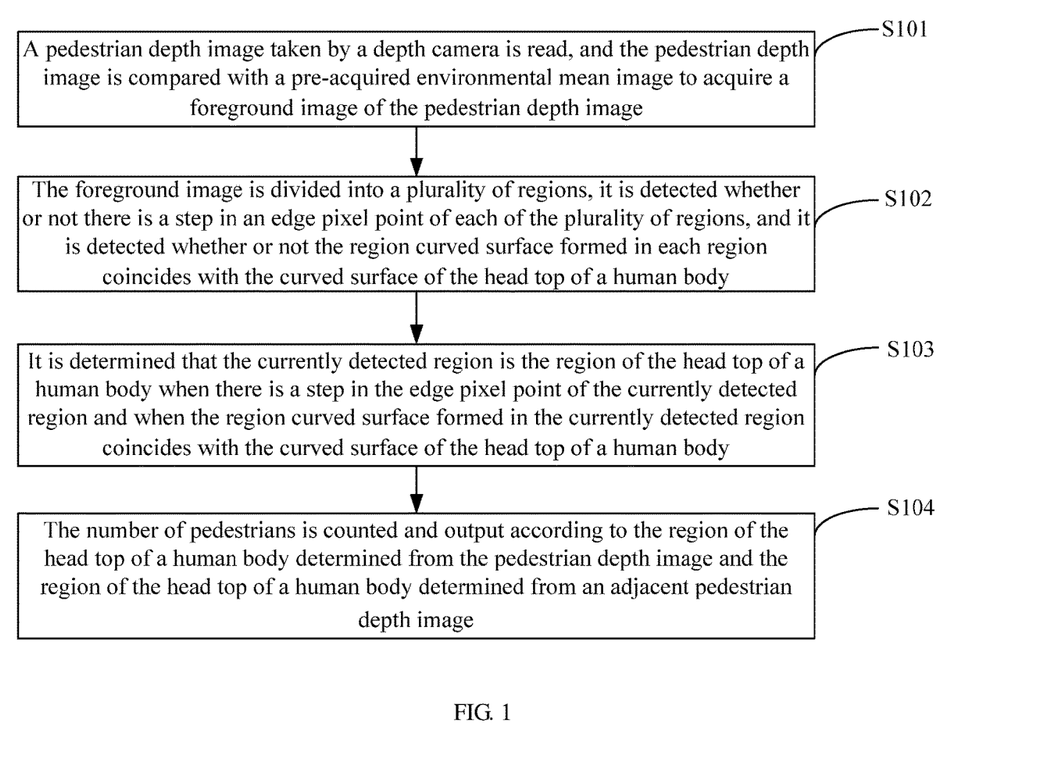
FIG. 1 is a flow chart of an implementation of a method for counting pedestrians based on the identification of the head top of a human body provided according to Embodiment 1 of the present disclosure.

FIG. 1 shows a flow of an implementation of a method for counting pedestrians based on the identification of the head top of a human body provided according to Embodiment 1 of the present disclosure. For convenience of explanation, only the parts related to the embodiments of the present disclosure are shown, which will be described in details as follows.

Step S101: A pedestrian depth image taken by a depth camera is read, and the pedestrian depth image is compared with a pre-acquired environmental mean image to acquire a foreground image of the pedestrian depth image.

The embodiments of the present disclosure are applicable to a computer device or system for counting pedestrians or human traffic to achieve counting the number of pedestrians. In the embodiments of the present disclosure, pedestrians are first photographed with a depth camera to acquire a depth image of pedestrians, and then the pedestrian depth image is compared with the pre-acquired environmental mean image to acquire a foreground image of the pedestrian depth image.

Preferably, with the formula $$\text{mask}(x, y) = \begin{cases} 0 & \text{if } |f(x, y) - bg(x, y)| < T_{bg}; \\ f(x, y) & \text{else} \end{cases},$$

the foreground image of the pedestrian depth image is acquired, where mask(x, y) is the value of the pixel point at the position (x, y) in the foreground image, f(x, y) is the value of the pixel point at the position (x, y) in the pedestrian depth image, bg(x, y) is the value of the pixel point at the position (x, y) in the environmental mean image, $T_{bg}$ is a preset value, and the environmental mean image is the environmental image of the region taken by the depth camera, which only contains the environment background without containing a moving target. Thus, before comparing the pedestrian depth image with the pre-acquired environmental mean image, a preset number of environmental images of the pedestrian walking environment may be acquired, and the mean of the preset number of environmental images may be calculated to acquire the environmental mean image so as to acquire a more stable and accurate environmental mean image. The foreground image acquired in this manner contains only a potential head region in the original image and rejects the irrelevant region of the original image so that the calculation process may be simplified and the response speed of the embodiments of the present disclosure is improved without reducing the accuracy of acquiring the foreground image.

Step S102: The foreground image is divided into a plurality of regions, it is detected whether or not there is a step in an edge pixel point of each of the plurality of regions, and it is detected whether or not the region curved surface formed in each region coincides with the curved surface of the head top of a human body.

In the embodiment of the present disclosure, when the foreground image is divided into a plurality of regions, a preset seed point growth algorithm may be used to find a plurality of communication regions in the foreground image to divide the foreground image into a corresponding plurality of regions. For example, a regional growth method or a flooding method and a scanning line method similar to the seed point growth algorithm may be used. Preferably, the regional growth method is used to divide the foreground image into a plurality of regions to increase the region dividing speed.

Step S103: It is determined that the currently detected region is the region of the head top of a human body when there is a step in the edge pixel point of the currently detected region and when the region curved surface formed in the currently detected region coincides with the curved surface of the head top of a human body.

In order to accurately identify a human head, the embodiment of the present disclosure simultaneously detects the steps of the image region of the head top of the human body in the depth image and of the image region of other parts and the specific shape of the head top of the human body, and it is determined that the currently detected region is the region of the head top of a human body only when there is a step in the edge pixel point of the currently detected region and when the region curved surface formed in the currently detected region coincides with the curved surface of the head top of a human body in order to effectively improve the accuracy of identifying pedestrians.

Step S104: The number of pedestrians is counted and output according to the region of the head top of a human body determined from the pedestrian depth image and the region of the head top of a human body determined from an adjacent pedestrian depth image.

In the embodiment of the present disclosure, when the number of pedestrians is counted and output, preferably, a matching region of the head top of a human body in the pedestrian depth image and the adjacent pedestrian depth image is determined according to the position similarity and area similarity of the region of the head top of a human body in the pedestrian depth image and the adjacent pedestrian depth image in order to achieve tracking pedestrians. The counting operation is performed on a counter for counting the number of pedestrians when it is detected that the matching region (that is, pedestrians) of the head top of a human body continuously traverses a predetermined marked line in the image. The number of pedestrians counted by the counter is output.

Preferably, when determining the matching region of the head top of a human body in the pedestrian depth image and the adjacent pedestrian depth image, the determined region of the head top of a human body may be surrounded by a rectangular frame. The head region is inscribed in the rectangular frame. Taking into account the fact that the position and area of the region of the head top of a human body between two adjacent frame images will not change drastically, the tracking of the region of the head top of a human body may be determined by calculating the joint similarity between the position coordinate of the intersection point of the diagonal of the rectangular box of the region of the head top of a human body between successive adjacent images and the area size of the region of the head top of a human body. Preferably, the joint similarity of the region of the head top of a human body between successive adjacent images is calculated using the following formula (1):

$$P_{associate}(d1,d2)=A_{position}(d1,d2)*A_{area}(d1,d2) \quad (1)$$

Where d1 and d2 represent the region of the head top of a human body in two adjacent frame images, respectively, $A_{position}$ and $A_{area}$ represent the area similarity and the area similarity, respectively.

Preferably, $A_{position}$ and $A_{area}$ may be calculated by the following formula:

$$A_{position}(d1, d2) = \exp\left[-\frac{(x1-x2)^2}{\alpha_x^2}\right] * \exp\left[-\frac{(y1-y2)^2}{\alpha_y^2}\right] \quad (2)$$

$$A_{area}(d1, d2) = \exp\left[-\frac{(s1-s2)^2}{\alpha_s^2}\right] \quad (3)$$

Where (x1, y1) and (x2, y2) represent the coordinates of the intersection point of the diagonal of the regions d1 and d2 of the head top of a human body in two adjacent frame images, s1 and s2 represent the area of the regions d1 and d2 of the head top of a human body in two adjacent frame images, $a_x$ and $a_y$ represent the variance of the coordinates of the intersection point of the diagonal of the rectangular box of the region of the head top of a human body in two adjacent frame images on the X-axis and the Y-axis, and $a_s$ represents the variance of the area of the region of the head top of a human body in two adjacent frame images.

When the joint similarity value obtained by the above calculation exceeds a preset threshold value, the corresponding two regions of the head tops of human bodies may be determined as the matching head top region, so that the inter-frame image pedestrian tracking may be achieved. Thereafter, the counting operation is performed on a counter for counting the number of pedestrians when it is detected that the matching region of the head top of a human body continuously traverses a marked line at the predetermined position in the frame image so as to realize the precise statistics of pedestrians, and finally, the number of pedestrians counted by the counter is output.

Further preferably, the number of pedestrians in different directions may be counted according to the direction in which the matching region of the head top of a human body continuously traverses a marked line at the predetermined position in the frame image so as to achieve counting the number of pedestrians according to the human traffic direction to provide a more accurate basis for controlling the human traffic.

According to the embodiment of the present disclosure, the image of the head top of a human body is acquired by a depth camera in combination of the features of the head top of a human body. It is determined that the currently detected region is the region of the head top of a human body only when it is determined that there is a step in the edge pixel point of the image of the head top and when the region curved surface formed in the currently detected region coincides with the curved surface of the head top of a human body, and then the number of pedestrians included in the pedestrian depth image is counted and output, greatly improving the accuracy that the computer device identifies the head top of a human body and then achieving accurately counting pedestrians.

Embodiment 2

Figure 2:
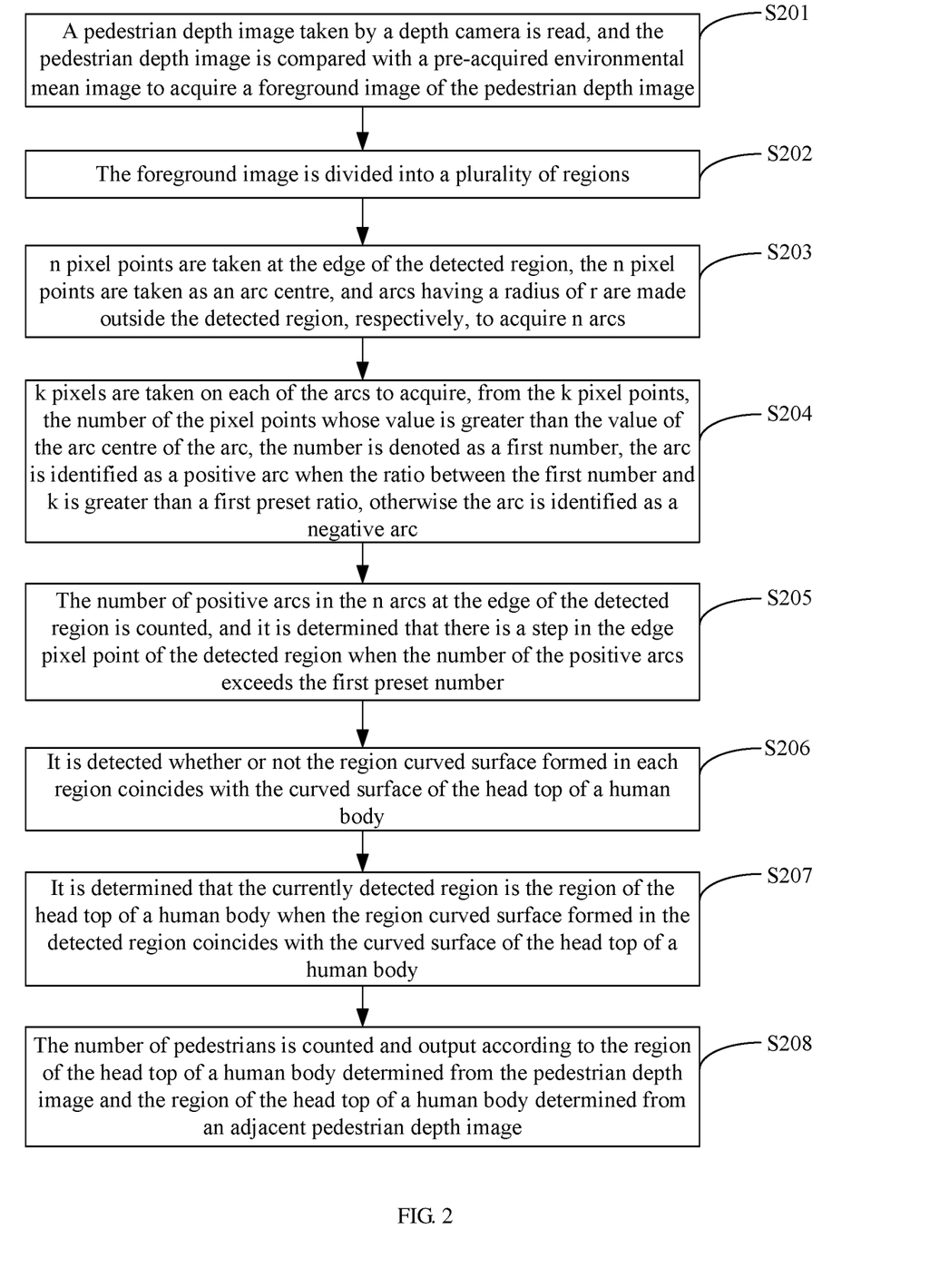
FIG. 2 is a flow chart of an implementation of a method for counting pedestrians based on the identification of the head top of a human body provided according to Embodiment 2 of the present disclosure.

FIG. 2 shows a flow of an implementation of a method for counting pedestrians based on the identification of the head top of a human body provided according to Embodiment 2 of the present disclosure. For convenience of explanation, only the parts related to the embodiments of the present disclosure are shown, which will be described in details as follows.

Step S201: A pedestrian depth image taken by a depth camera is read, and the pedestrian depth image is compared with a pre-acquired environmental mean image to acquire a foreground image of the pedestrian depth image.

The embodiments of the present disclosure are applicable to a computer device or system for counting pedestrians or human traffic to achieve counting the number of pedestrians. In the embodiments of the present disclosure, pedestrians are first photographed with a depth camera to acquire a depth image of pedestrians, and then the pedestrian depth image is compared with the pre-acquired environmental mean image to acquire a foreground image of the pedestrian depth image.

Preferably, with the formula $$\text{mask}(x, y) = \begin{cases} 0 & \text{if } |f(x, y) - bg(x, y)| < Tbg; \\ f(x, y) & \text{else} \end{cases},$$

the foreground image of the pedestrian depth image is acquired, where mask(x, y) is the value of the pixel point at the position (x, y) in the foreground image, f(x, y) is the value of the pixel point at the position (x, y) in the pedestrian depth image, bg(x, y) is the value of the pixel point at the position (x, y) in the environmental mean image, $T_{bg}$ is a preset value, and the environmental mean image is the environmental image of the region taken by the depth camera, which only contains the environment background without containing a moving target. Thus, before comparing the pedestrian depth image with the pre-acquired environmental mean image, a preset number of environmental images of the pedestrian walking environment may be acquired, and the mean of the preset number of environmental images may be calculated to acquire the environmental mean image so as to acquire a more stable and accurate environmental mean image. The foreground image acquired in this manner may simplify its calculation process and improve the response speed of the embodiments of the present disclosure to some extent without reducing the accuracy of acquiring the foreground image.

Step S202: The foreground image is divided into a plurality of regions.

In the embodiment of the present disclosure, when the foreground image is divided into a plurality of regions, a preset seed point growth algorithm may be used to find a plurality of communication regions in the foreground image to divide the foreground image into a corresponding plurality of regions. For example, a regional growth method or a flooding method and a scanning line method similar to the seed point growth algorithm may be used. Preferably, the regional growth method is used to divide the foreground image into a plurality of regions to increase the region dividing speed.

Step S203: n pixel points are taken at the edge of the detected region, the n pixel points are taken as an arc centre, and arcs having a radius of r are made outside the detected region, respectively, to acquire n arcs.

Figure 3:
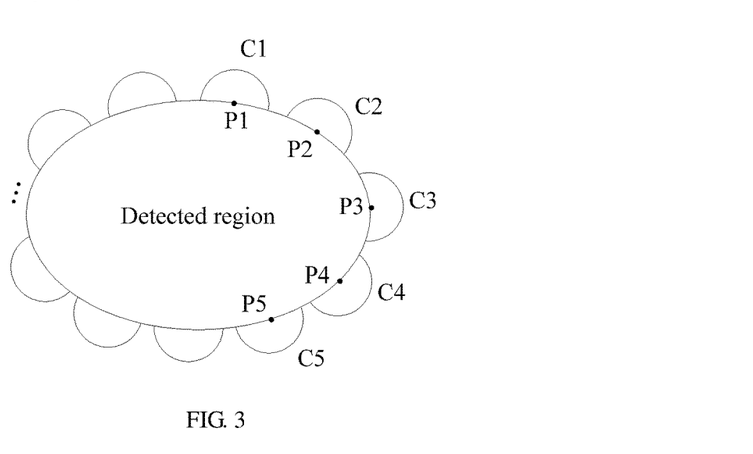
FIG. 3 is a schematic diagram of an outer semicircle of a detected region provided according to Embodiment 2 of the present disclosure.

In the embodiment of the present disclosure, when it is detected whether or not there is a step in the edge pixel point of each of the plurality of regions, n pixel points are taken at the edge of the detected region, the n pixel points are taken as an arc centre, and arcs having a radius of r are made outside the detected region, respectively, wherein the size of r and the size of the current region form a proportional relationship. As an example, as shown in FIG. 3, n pixel points P1, P2, P3, P4, P5, . . . , Pn are taken at the edge of the detected region, these pixel points are taken as an arc centre, and corresponding arcs C1, C2, C3, C4, C5, . . . , Cn having a radius of r are made outside the detected region, respectively, wherein the distance between two adjacent pixel points is a preset fixed value, and of course, it may also be set to a different distance value according to the specific situation.

Step S204: k pixels are taken on each of the arcs to acquire, from the k pixel points, the number of the pixel points whose value is greater than the value of the arc centre of the arc, the number is denoted as a first number, the arc is identified as a positive arc when the ratio between the first number and k is greater than a first preset ratio, otherwise the arc is identified as a negative arc.

In the embodiment of the present disclosure, when the arc is identified, it may be directly marked with a corresponding symbol or numeral to facilitate the subsequent counting of the positive and negative arcs.

Step S205: The number of positive arcs in the n arcs at the edge of the detected region is counted, and it is determined that there is a step in the edge pixel point of the detected region when the number of the positive arcs exceeds the first preset number.

In the embodiment of the present disclosure, n, r, k, and the first preset number are preset integers and may be set according to the detection accuracy so that it may be set according to the different detection accuracy requirements, and the flexibility of the system for counting human traffic is improved. In the above manner, it may be accurately determined whether or not there is a step in an edge pixel point of the detected region, the step detection process is simplified, and the efficiency of identifying the head top of a human body is improved to some extent.

Step S206: It is detected whether or not the region curved surface formed in each region coincides with the curved surface of the head top of a human body.

Step S207: It is determined that the currently detected region is the region of the head top of a human body when the region curved surface formed in the detected region coincides with the curved surface of the head top of a human body.

After detecting that there is a step in the edge pixel point of the detected region, in order to further accurately identify the human head, the embodiments of the present disclosure further detect the curved surface shape of the depth image of the detected region. It is determined that the currently detected region is the region of the head top of a human body only when the region curved surface formed in the detected region coincides with the curved surface of the head top of a human body to effectively improve the accuracy of identifying pedestrians. When it is detected whether or not the region curved surface formed in the detected region coincides with the curved surface of the head top of a human body, it may be specifically determined whether or not the region curved surface formed by the depth image of the detected region is an upwardly convex curved surface to coincide with the shape of the head top of a human body.

Step S208: The number of pedestrians is counted and output according to the region of the head top of a human body determined from the pedestrian depth image and the region of the head top of a human body determined from an adjacent pedestrian depth image.

In the embodiment of the present disclosure, when the number of pedestrians is counted and output, preferably, a matching region of the head top of a human body in the pedestrian depth image and the adjacent pedestrian depth image may be determined according to the position similarity and area similarity of the region of the head top of a human body in the pedestrian depth image and the adjacent pedestrian depth image in order to achieve tracking pedestrians. The counting operation is performed on a counter for counting the number of pedestrians when it is detected that the matching region (that is, pedestrians) of the head top of a human body continuously traverses a predetermined marked line in the image. The number of pedestrians counted by the counter is output.

Embodiment 3

Figure 4:
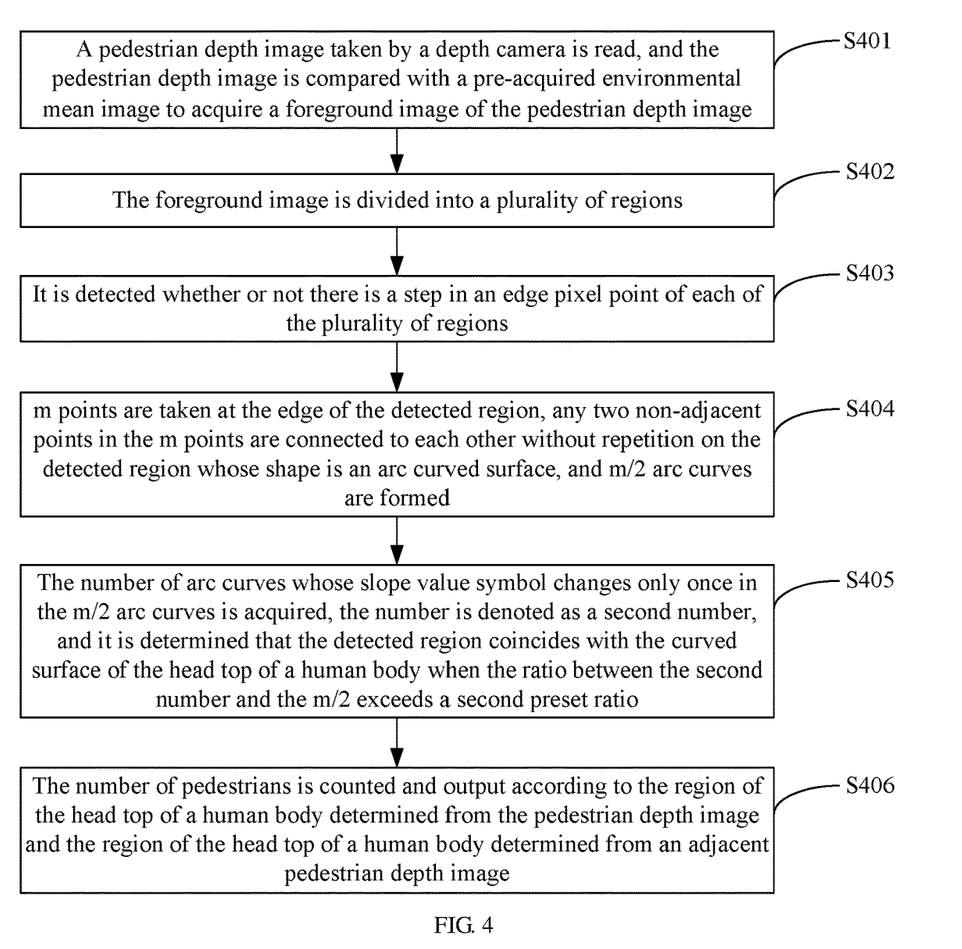
FIG. 4 is a flow chart of an implementation of a method for counting pedestrians based on the identification of the head top of a human body provided according to Embodiment 3 of the present disclosure.

FIG. 4 shows a flow of an implementation of a method for counting pedestrians based on the identification of the head top of a human body provided according to Embodiment 3 of the present disclosure. For convenience of explanation, only the parts related to the embodiments of the present disclosure are shown, which will be described in details as follows.

Step S401: A pedestrian depth image taken by a depth camera is read, and the pedestrian depth image is compared with a pre-acquired environmental mean image to acquire a foreground image of the pedestrian depth image.

Step S402: The foreground image is divided into a plurality of regions.

Step S403: It is detected whether or not there is a step in an edge pixel point of each of the plurality of regions.

Step S404: When there is a step in an edge pixel point of the currently detected region, m points are taken at the edge of the detected region, any two non-adjacent points in the m points are connected to each other without repetition on the detected region whose shape is an arc curved surface, and m/2 arc curves are formed.

Step S405: The number of arc curves whose slope value symbol changes only once in the m/2 arc curves is acquired, the number is denoted as a second number, and it is determined that the detected region coincides with the curved surface of the head top of a human body when the ratio between the second number and the m/2 exceeds a second preset ratio.

Figure 5:
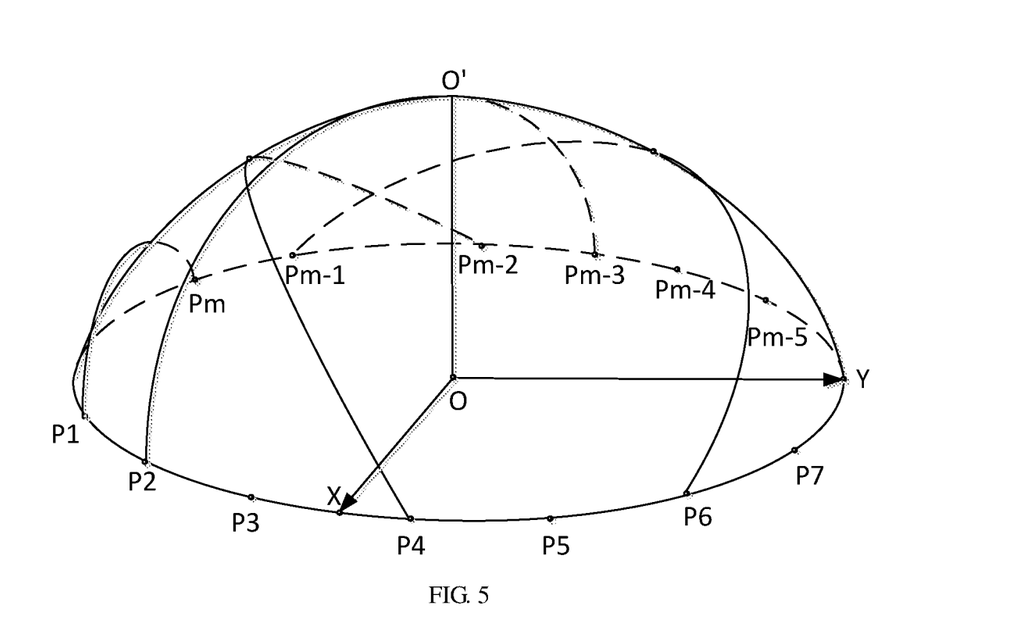
FIG. 5 is a schematic diagram of an arc curve on a curved surface of a detected region provided according to Embodiment 3 of the present disclosure.

In the embodiment of the present disclosure, when there is a step in the edge pixel point of the currently detected region, it is further detected whether or not the detected region coincides with the curved surface shape of the head top of a human body. When it is detected whether or not the detected region coincides with the curved surface shape of the head top of a human body, m (m is an even number) points (P1, P2, P3, . . . , Pm) are arbitrarily taken at intervals at the edge of the detected region, as shown in FIG. 5. Any two non-adjacent points in the m points are connected to each other without repetition by the pixel points on the detected region whose shape is an arc curved surface or an arc surface, and m/2 arc curves are formed. The number of arc curves whose slope value symbol changes only once in the m/2 arc curves is acquired, the number is denoted as a second number, and it is determined that the detected region coincides with the curved surface of the head top of a human body when the ratio between the second number and the m/2 exceeds a second preset ratio. On the contrary, it may be determined that the currently detected region does not coincide with the curved surface of the head top of a human body.

In the embodiment of the present disclosure, m is a preset integer. Through the above manner of the embodiment of the present disclosure, it may be accurately determined whether or not the currently detected region coincides with the curved surface shape of the head top of a human body, improving the accuracy of identifying the head top of a human body.

Step S406: The number of pedestrians is counted and output according to the region of the head top of a human body determined from the pedestrian depth image and the region of the head top of a human body determined from an adjacent pedestrian depth image.

In the embodiment of the present disclosure, when the number of pedestrians is counted and output, preferably, a matching region of the head top of a human body in the pedestrian depth image and the adjacent pedestrian depth image may be determined according to the position similarity and area similarity of the region of the head top of a human body in the pedestrian depth image and the adjacent pedestrian depth image in order to achieve tracking pedestrians. The counting operation is performed on a counter for counting the number of pedestrians when it is detected that the matching region (that is, pedestrians) of the head top of a human body continuously traverses a predetermined marked line in the image. The number of pedestrians counted by the counter is output.

In the embodiment of the present disclosure, when it is detected whether or not the detected region coincides with the curved surface shape of the head top of a human body, m points are taken at the edge of the detected region, any two non-adjacent points in the m points are connected to each other without repetition on the detected region whose shape is an arc curved surface, and m/2 arc curves are formed. The number of arc curves whose slope value symbol changes only once in the m/2 arc curves is acquired, and it is determined that the detected region coincides with the curved surface of the head top of a human body when the ratio between the number and the m/2 exceeds a second preset ratio. The process of determining the shape of the head top of a human body is simplified while improving the accuracy of identifying the head top of a human body. The number of pedestrians may be timely fed back to the user, and the efficiency of counting pedestrians is improved.

Embodiment 4

Figure 6:
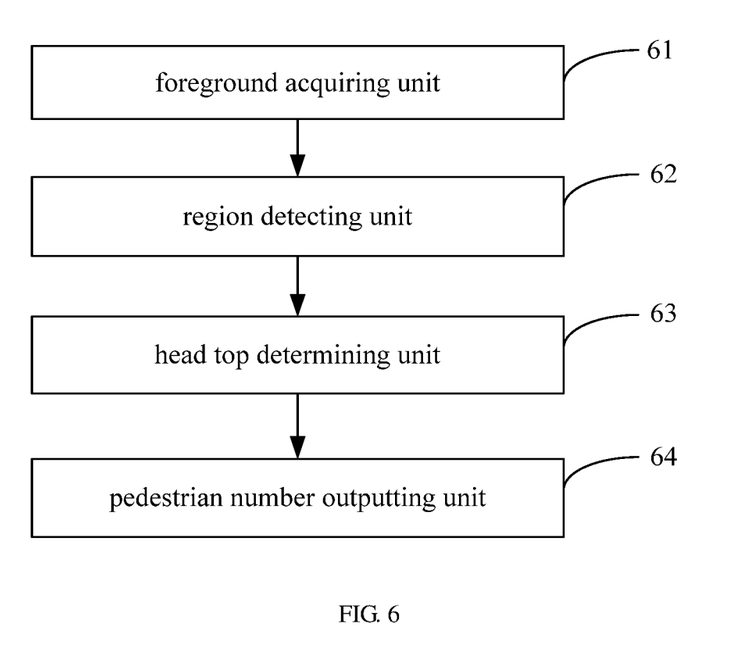
FIG. 6 is a flow chart of an implementation of a device for counting pedestrians based on the identification of the head top of a human body provided according to Embodiment 4 of the present disclosure.

FIG. 6 shows a structure of a device for counting pedestrians based on the identification of the head top of the human body provided according to Embodiment 4 of the present disclosure. For convenience of explanation, only the parts related to the embodiments of the present disclosure are shown, including:

a foreground acquiring unit 61 configured to read a pedestrian depth image taken by a depth camera, and compare the pedestrian depth image and a pre-acquired environmental mean image to acquire a foreground image of the pedestrian depth image;

a region detecting unit 62 configured to divide the foreground image into a plurality of regions, detect whether or not there is a step in an edge pixel point of each of the plurality of regions, and detect whether or not the region curved surface formed in each region coincides with the curved surface of the head top of a human body;

a head top determining unit 63 configured to determine that the currently detected region is the region of the head top of a human body when there is a step in the edge pixel point of the currently detected region and when the region curved surface formed in the currently detected region coincides with the curved surface of the head top of a human body; and a pedestrian number outputting unit 64 configured to count and output the number of pedestrians according to the region of the head top of a human body determined from the pedestrian depth image and the region of the head top of a human body determined from an adjacent pedestrian depth image.

In embodiments of the present disclosure, the units of the device for counting pedestrians based on the identification of the head top of the human body may be implemented by respective hardware or software units. Each unit may be a separate software or hardware unit or may be integrated into a software or hardware unit of a computer device. The present disclosure is not limited thereto. The specific implementation of each unit may be described with reference to the steps corresponding to Embodiment 1, which will not be described here.

Embodiment 5

Figure 7:
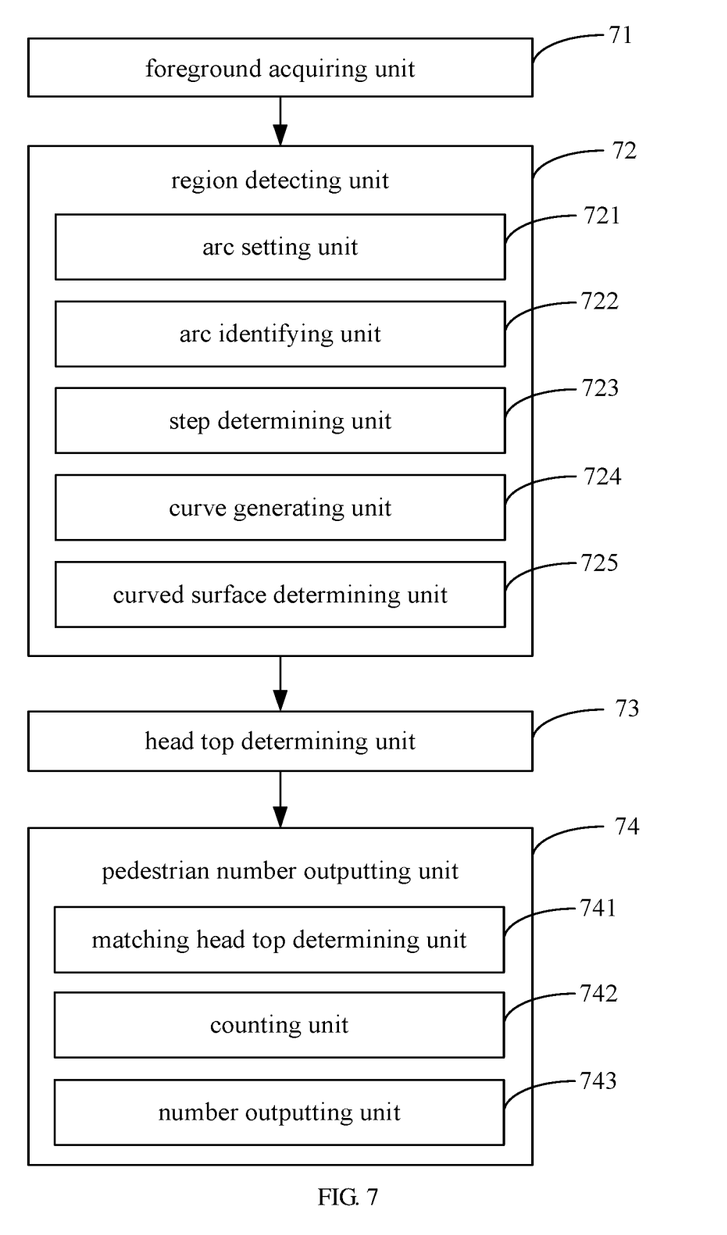
FIG. 7 is a flow chart of an implementation of a device for counting pedestrians based on the identification of the head top of a human body provided according to Embodiment 5 of the present disclosure.

FIG. 7 shows a structure of a device for counting pedestrians based on the identification of the head top of the human body provided according to Embodiment 5 of the present disclosure. For convenience of explanation, only the parts related to the embodiments of the present disclosure are shown, including:

a foreground acquiring unit 71 configured to read a pedestrian depth image taken by a depth camera, and compare the pedestrian depth image and a pre-acquired environmental mean image to acquire a foreground image of the pedestrian depth image;

a region detecting unit 72 configured to divide the foreground image into a plurality of regions, detect whether or not there is a step in an edge pixel point of each of the plurality of regions, and detect whether or not the region curved surface formed in each region coincides with the curved surface of the head top of a human body;

a head top determining unit 73 configured to determine that the currently detected region is the region of the head top of a human body when there is a step in the edge pixel point of the currently detected region and when the region curved surface formed in the currently detected region coincides with the curved surface of the head top of a human body; and a pedestrian number outputting unit 74 configured to count and output the number of pedestrians according to the region of the head top of a human body determined from the pedestrian depth image and the region of the head top of a human body determined from an adjacent pedestrian depth image.

Preferably, the region detecting unit 72 includes:

an arc setting unit 721 configured to take n pixel points at the edge of the detected region, take the n pixel points as an arc centre, and make arcs having a radius of r outside the detected region, respectively, to acquire n arcs, wherein the distance between two adjacent pixel points in the n pixel points is a preset fixed value;

an arc identifying unit 722 configured to take k pixel points on each of the arcs to acquire, from the k pixel points, the number of the pixel points whose value is greater than the value of the arc centre of the arc, denote the number as a first number, identify the arc as a positive arc when the ratio between the first number and k is greater than a first preset ratio, otherwise identify the arc as a negative arc; and a step determining unit 723 configured to count the number of positive arcs in the n arcs at the edge of the detected region, and determine that there is a step in the edge pixel point of the detected region when the number of the positive arcs exceeds the first preset number.

More preferably, the region detecting unit 72 may further include:

a curve generating unit 724 configured to take m points at the edge of the detected region, connect any two non-adjacent points in the m points to each other without repetition on the detected region whose shape is an arc curved surface, and form m/2 arc curves, where m is an even number; and a curved surface determining unit 725 configured to acquire the number of arc curves whose slope value symbol changes only once in the m/2 arc curves, denote the number as a second number, and determine that the detected region coincides with the curved surface of the head top of a human body when the ratio between the second number and the m/2 exceeds a second preset ratio.

Preferably, the pedestrian number outputting unit 74 includes:

a matching head top determining unit 741 configured to determine a matching region of the head top of a human body in the pedestrian depth image and the adjacent pedestrian depth image according to the position similarity and area similarity of the region of the head top of a human body in the pedestrian depth image and the adjacent pedestrian depth image;

a counting unit 742 configured to perform counting operation on a counter for counting the number of pedestrians when it is detected that the matching region of the head top of a human body continuously traverses a predetermined marked line; and a number outputting unit 743 configured to output the number of pedestrians counted by the counter.

In embodiments of the present disclosure, the units of the device for counting pedestrians based on the identification of the head top of the human body may be implemented by respective hardware or software units. Each unit may be a separate software or hardware unit or may be integrated into a software or hardware unit. The present disclosure is not limited thereto. The specific implementation of each unit may be described with reference to the above Embodiment 2 and Embodiment 3, which will not be described here.

The foregoing disclosure is merely illustrative of preferred embodiments of the present disclosure but is not intended to limit the present disclosure, and any modifications, equivalent substitutions, and improvements made within the spirit and principle of the present disclosure should be encompassed in the scope of protection of the present disclosure.

What is claimed is:

1. A method for counting pedestrians based on an identification of a head top of a human body, wherein the method comprises:

reading a pedestrian depth image taken by a depth camera, and comparing the pedestrian depth image and a pre-acquired environmental mean image to acquire a foreground image of the pedestrian depth image;

dividing the foreground image into a plurality of regions, detecting whether or not there is a step in an edge pixel point of each of the plurality of regions, and detecting whether or not a region curved surface formed in each region coincides with a curved surface of the head top of the human body;

determining that a currently detected region is a region of the head top of the human body when there is a step in the edge pixel point of the currently detected region and when the region curved surface formed in the currently detected region coincides with the curved surface of the head top of the human body; and counting and outputting a number of pedestrians according to the region of the head top of the human body determined from the pedestrian depth image and the region of the head top of the human body determined from an adjacent pedestrian depth image;

wherein the step of detecting whether or not there is a step in an edge pixel point of each of the plurality of regions comprises:

for each region of the plurality of regions, taking n pixel points at an edge of the respective region, taking the n pixel points as an arc centre, and making arcs having a radius of r outside the respective region, respectively, to acquire n arcs, wherein a distance between two adjacent pixel points in the n pixel points is a preset fixed value;

taking k pixel points on each of the arcs to acquire, from the k pixel points, a number of the pixel points whose value is greater than a value of the arc centre of the arc, denoting the number as a first number, identifying the arc as a positive arc when the ratio between the first number and k is greater than a first preset ratio, otherwise identifying the arc as a negative arc; and counting the number of positive arcs in the n arcs at the edge of the respective region, and determining that there is a step in the edge pixel point of the respective region when the number of the positive arcs exceeds the first preset number.

2. The method according to claim 1, wherein prior to the step of comparing the pedestrian depth image and the pre-acquired environmental mean image, the method further comprises:

acquiring a preset number of environmental images of a pedestrian walking environment, and calculating a mean of the preset number of environmental images to acquire the environmental mean image.

3. The method according to claim 1, wherein the step of dividing the foreground image into the plurality of regions comprises:

using a preset seed point growth algorithm to find a plurality of communication regions in the foreground image to divide the foreground image into a corresponding plurality of regions.

4. The method according to claim 1, wherein the step of detecting whether or not the region curved surface formed in each region coincides with the curved surface of the head top of the human body comprises:

taking m points at an edge of the respective region, connecting any two non-adjacent points in the m points to each other without repetition on the respective region whose shape is an arc curved surface, and forming m/2 arc curves, where m is an even number; and acquiring the number of arc curves whose slope value symbol changes only once in the m/2 arc curves, denoting the number as a second number, and determining that the respective region coincides with the curved surface of the head top of the human body when the ratio between the second number and the m/2 exceeds a second preset ratio.

5. The method according to claim 1, wherein the step of counting and outputting the number of pedestrians according to the region of the head top of the human body determined from the pedestrian depth image and the region of the head top of the human body determined from the adjacent pedestrian depth image comprises:

determining a matching region of the head top of the human body in the pedestrian depth image and the adjacent pedestrian depth image according to a position similarity and area similarity of the region of the head top of the human body in the pedestrian depth image and the adjacent pedestrian depth image;

performing counting operation on a counter for counting the number of pedestrians when it is detected that the matching region of the head top of the human body continuously traverses a predetermined marked line; and outputting the number of pedestrians counted by the counter.

6. A device for counting pedestrians based on an identification of a head top of a human body, wherein the device comprises:

a foreground acquiring unit configured to read a pedestrian depth image taken by a depth camera, and compare the pedestrian depth image and a pre-acquired environmental mean image to acquire a foreground image of the pedestrian depth image;

a region detecting unit configured to divide the foreground image into a plurality of regions, detect whether or not there is a step in an edge pixel point of each of the plurality of regions, and detect whether or not a region curved surface formed in each region coincides with a curved surface of the head top of the human body;

a head top determining unit configured to determine that a currently detected region is a region of the head top of the human body when there is a step in the edge pixel point of the currently detected region and when the region curved surface formed in the currently detected region coincides with the curved surface of the head top of the human body; and a pedestrian number outputting unit configured to count and output a number of pedestrians according to the region of the head top of the human body determined from the pedestrian depth image and the region of the head top of the human body determined from an adjacent pedestrian depth image;

wherein the region detecting unit comprises:

an arc setting unit configured to, for each region of the plurality of regions, take n pixel points at an edge of the respective region, take the n pixel points as an arc centre, and make arcs having a radius of r outside the respective region, respectively, to acquire n arcs, wherein a distance between two adjacent pixel points in the n pixel points is a preset fixed value;

an arc identifying unit configured to, for each region of the plurality of regions, take k pixel points on each of the arcs to acquire, from the k pixel points, a number of the pixel points whose value is greater than a value of the arc centre of the arc, denote the number as a first number, identify the arc as a positive arc when the ratio between the first number and k is greater than a first preset ratio, otherwise identify the arc as a negative arc; and a step determining unit configured to, for each region of the plurality of regions, count the number of positive arcs in the n arcs at the edge of the respective region, and determine that there is a step in the edge pixel point of the respective region when the number of the positive arcs exceeds the first preset number.

7. The device according to claim 6, wherein the region detecting unit comprises:

a curve generating unit configured to take m points at an edge of the respective region, connect any two non-adjacent points in the m points to each other without repetition on the Respective region whose shape is an arc curved surface, and form m/2 arc curves, where m is an even number; and a curved surface determining unit configured to acquire the number of arc curves whose slope value symbol changes only once in the m/2 arc curves, denote the number as a second number, and determine that the respective region coincides with the curved surface of the head top of the human body when the ratio between the second number and the m/2 exceeds a second preset ratio.

8. The device according to claim 6, wherein the pedestrian number outputting unit comprises:

a matching head top determining unit configured to determine a matching region of the head top of the human body in the pedestrian depth image and the adjacent pedestrian depth image according to a position similarity and area similarity of the region of the head top of the human body in the pedestrian depth image and the adjacent pedestrian depth image;

a counting unit configured to perform counting operation on a counter for counting the number of pedestrians when it is detected that the matching region of the head top of the human body continuously traverses a predetermined marked line; and a number outputting unit configured to output the number of pedestrians counted by the counter.

* * * * *